Oct. 15, 1935.                C. M. YOUNG                2,017,271
                              EMERGENCY LINK
                       Original Filed Feb. 21, 1927

Inventor
Charles M. Young
By Louis M. Schmidt
Atty.

UNITED STATES PATENT OFFICE 2,017,271

EMERGENCY LINK

Charles M. Young, New Britain, Conn., assignor of one-half to Leo J. Gervais, Hartford, Conn.

Application February 21, 1927, Serial No. 169,684
Renewed June 6, 1929

3 Claims. (Cl. 59—85)

My invention relates to improvements in emergency links for use in the tread members of anti-skidding devices, of the form that is adapted for use in replacing a worn and broken link of the chain structure such as is in common use, and of the particular form that is a one-piece structure, without separate or moving parts, involving the use of a gap in the side through one of the strands, and the object of my improvement is to produce an emergency link that has a gap of ample dimensions such as to permit of applying the same to substantially any part of the unbroken and remaining links, without regard to the detail of reduction of the material by wear on the road, and that, furthermore, is constructed and arranged so that the gap will be reduced and will be substantially closed under conditions of use, and which closure will be effected immediately following the application or use, or as is sometimes described, that will close with one turn of the wheel.

In the accompanying drawing:—

Figure 1:
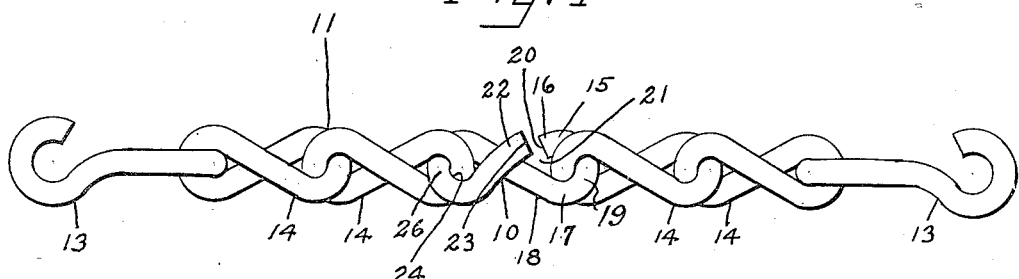
Figure 1 is a side elevation of the tread member for an anti-skidding device and in which is incorporated an emergency link embodying my invention and in the condition when first applied, with the gap at the maximum condition of opening.
Figure 2:
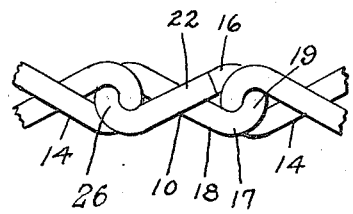
Figure 2 is a fragmentary view of the emergency link that is shown in Fig. 1 and the adjacent parts and with the link substantially closed as to the gap.
Figure 3:
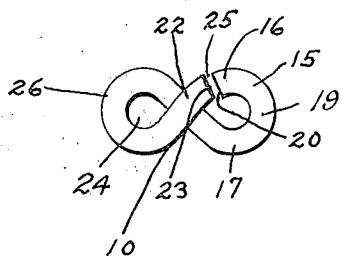
Figure 3 is a plan view of the emergency link.
Figure 4:
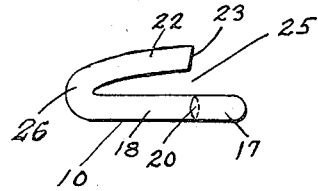
Figure 4 is an edge view of the same.

My improved emergency link 10, as shown in Fig. 1, is used to replace the middle link of a tread member 11 of an anti-skidding device, corresponding thus to a common use of said emergency link. The middle link is the one that first gives out because of wear from contact with the roadbed and the insertion of the emergency link 10 in lieu thereof permits of further use of the tread member, substantially as before and as is well understood.

The structure of the tread member 11 on each side of the emergency link 10 comprises a hook 13 at the end and a pair of similar chain links 14 in series and intermediate the emergency link 10 and the hook 13.

Thus, the emergency link 10 is connected by each of its ends with an ordinary link 14. Said ends are each in the form of a substantially closed eye in the final closed position or condition and the structure of the emergency link 10 is in the form of a figure "8", with a pair of crossed strands at the middle. Initially there are suitable gaps or clearance spaces for admitting the ordinary chain links 14 to the eyes that are provided by properly positioning the free end portions of the wire from which the emergency link 10 is formed, one of which free end portions is identified as one of the crossed strands mentioned above.

The eye 15, shown at the right end in the plan view, is substantially a fixed and rigid structure as to size and shape and comprises the short free end portion 16 on the bottom side; on the upper side has the arm 17 that is connected with or merges with the diagonally directed cross-strand 18; and at the end has the rounded seat portion 19 that inter-connects the arm 17 and free end portion 16.

As a detail, the fixed or rigid eye 15 and cross-strand 18 combined are in the form of a flat structure, arranged with the parts in a common plane. Also, the short free end portion 16 terminates so that the tip butt end face 20 is separated from the inter-connecting cross-strand 18 by a clearance space 21 that is sufficient to permit of the passage therethrough of the wire of the ordinary link 14 that is to be admitted to the eye 15.

In the final position the space 21 is effectively closed by the material of the free cross-strand 22, as will be described, the butt end face 23 thereof being brought into close relation to the tip butt end face 20 of the short free end portion 16.

Initially the free cross-strand 22 stands as a free end and unobstructed end member for admitting the ordinary link 14 with which the adjacent left end eye 24 is to be connected and is suitably spaced from the adjacent parts, and, also, is positioned so that under conditions of use, involving in some cases substantially one turn of the wheel, all open gaps and clearance spaces will be effectively closed.

Thus initially there is a clearance space 25 between the free cross-strand 22 and the adjacent inter-connecting cross-strand 18 and the butt end face 23 is positioned in off-set relation to the tip butt end face 20.

The initial positioning of the free cross-strand 22 is effected by the seat portion 26 of the left eye 24 that is intermediate the same and the inter-connecting cross-strand 18, which is suitably curved and also generally inclined relatively to the plane of the other parts.

I claim as my invention:—

1. An emergency link formed of a single piece of wire so as to provide a pair of loops, one at each end; a diagonally directed cross strand connecting said loops; a terminal for one of said loops in the form of a short free end; and a terminal for the other of said loops in the form of a relatively long free end, the butt end face of said short free end and one of the side faces of the middle portion of said cross strand defining a gap for admitting a link to the adjacent loop, said long free end being located in a plane that is common to said butt end face and intersects said middle portion, being directed at an inclination so as to clear said middle portion by a space to provide a link-admitting passage for the other loop, and said long free end terminating beyond said middle portion with the tip end in registration with said gap, so that, responsive to the bending of said long free end under conditions of use said tip end will be forced into close association with the walls of said gap so as to effectively close said gap and simultaneously said long free end will close said link-admitting passage.

2. An emergency link made of a piece of wire that is bent so as to form loops at the ends, a cross strand connecting the loops, and a terminal for each loop, said terminals and the middle part of said cross strand being closely associated and being separated respectively the one from the other so as to leave open gaps for admitting other links to the respective loops, one of said terminals being directed generally toward one of the side faces of said middle part, the other of said terminals being directed at an inclination to one side of said middle part and being relatively long so as to extend beyond said middle part, and the tip end thereof being positioned so that responsive to bending of the terminal under conditions of use the tip end will be brought into closer association with said one terminal so as to effectively close both of the loops.

3. An emergency link formed of a piece of wire bent so that in plan view it conforms substantially to a figure 8, comprising loops at the respective ends with a diagonally-directed strand inter-connecting an arm of one loop with an arm of the other loop and the arms of the two loops serving as free terminals, one of said terminals being relatively short and terminating with its end face in spaced relation to associated material of the link so as to provide a link-admitting gap, the other of said terminals being relatively long, extending at an inclination so as to be located in spaced relation to said diagonally directed strand and with its tip end portion being in further spaced relation to said short terminal, whereby, under conditions of use the pressure of a tire will bend the longer terminal so as to close the said gap, close the space between the longer terminal and the diagonally-directed strand, and close the space between the two terminals.

CHARLES M. YOUNG.